(12) United States Patent
Decady

(10) Patent No.: US 9,562,517 B1
(45) Date of Patent: Feb. 7, 2017

(54) UNIVERSAL POWER GENERATING SYSTEM

(71) Applicant: Robillard Decady, Miami, FL (US)

(72) Inventor: Robillard Decady, Miami, FL (US)

( * ) Notice: Subject to any disclaimer, the term of this patent is extended or adjusted under 35 U.S.C. 154(b) by 264 days.

(21) Appl. No.: 14/190,198

(22) Filed: Feb. 26, 2014

Related U.S. Application Data

(63) Continuation-in-part of application No. 13/306,601, filed on Nov. 29, 2011, now Pat. No. 8,860,357.

(51) Int. Cl.
| | |
|---|---|
| *H02J 7/00* | (2006.01) |
| *H01M 10/44* | (2006.01) |
| *H01M 10/46* | (2006.01) |
| *F03D 9/00* | (2016.01) |
| *C02F 1/14* | (2006.01) |

(52) U.S. Cl.
CPC ............... *F03D 9/002* (2013.01); *C02F 1/14* (2013.01); *H02J 7/00* (2013.01)

(58) Field of Classification Search
CPC .......... F03D 9/002; F03D 9/003; F03D 9/005; F03D 9/021; F03D 9/11
USPC ........................................................ 320/101
See application file for complete search history.

(56) References Cited

U.S. PATENT DOCUMENTS

| | | | |
|---|---|---|---|
| 2007/0040385 A1* | 2/2007 | Uchiyama | F03D 3/02 290/44 |
| 2010/0052604 A1* | 3/2010 | Sun | F03D 9/11 320/101 |
| 2010/0117370 A1* | 5/2010 | Phelps | F03D 13/20 290/55 |
| 2010/0140954 A1* | 6/2010 | Abou-Zeid | F03D 9/002 290/55 |

* cited by examiner

*Primary Examiner* — Richard Isla Rodas
*Assistant Examiner* — David V Henze-Gongola
(74) *Attorney, Agent, or Firm* — Albert Bordas, P.A.

(57) ABSTRACT

A universal power generating system including at least one electromagnetic generator assembly operatively associated with an air turned turbine whereby said air-turned turbine is placed within an enclosure and receives captured exhaust.

4 Claims, 7 Drawing Sheets

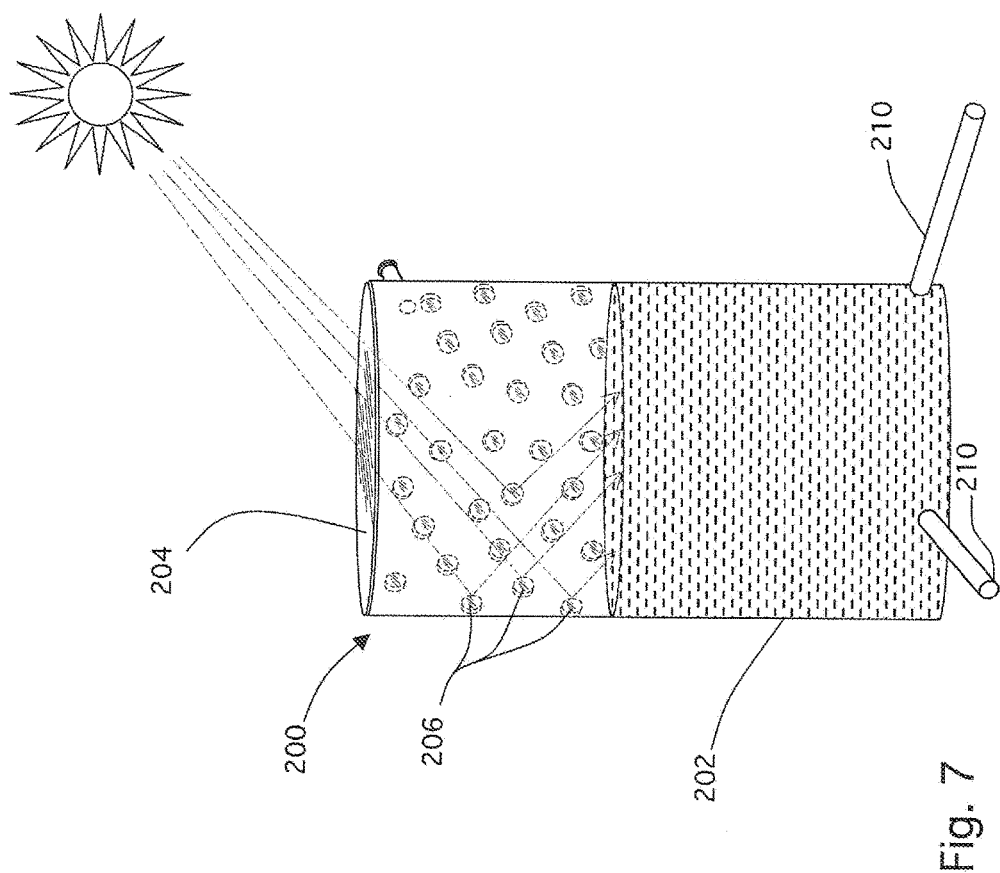

UNIVERSAL POWER GENERATING SYSTEM

OTHER RELATED APPLICATIONS

The present application is a continuation-in-part of pending U.S. patent application Ser. No. 13/306,601, filed on Nov. 29, 2011, which is hereby incorporated by reference.

BACKGROUND OF THE INVENTION

1. Field of the Invention

The present invention relates to power generating systems, and more particularly, to a universal power generating system.

2. Description of the Related Art

Effective power generating systems are necessary to deal with the present global energy crisis. Strains on electricity grids and price increases in the supply of energy resources have taken great tolls. There has been an enormous increase in the global demand for energy in recent years as a result of industrial development and population growth. Supply of energy is, therefore, far less than the actual demand. In the United States, contributing causes include over-consumption, an aging infrastructure, and choke-point disruption or bottlenecks at oil refineries and port facilities that restrict fuel supply. Seasonal variables also take a toll, whereby unusually cold winters lead to increased consumption of energy. Pipeline failures and other accidents may cause minor interruptions to energy supplies. A crisis could possibly emerge after infrastructure damage from severe weather.

In response to the petroleum crisis, the principles of green energy and sustainable living movements have gained popularity. This has led to increasing interest in alternate power/fuel research such as fuel cell technology, liquid nitrogen economy, hydrogen fuel, methanol, biodiesel, Karrick process, solar energy, artificial photosynthesis, geothermal energy, Space-based solar power, tidal energy, wave power, and wind energy, and fusion power. To date, only hydro-electricity and nuclear power have been significant alternatives to fossil fuel.

Hydrogen gas is currently produced at a net energy loss from natural gas, which is also experiencing declining production in North America and elsewhere. When not produced from natural gas, hydrogen still needs another source of energy to create it, also at a loss during the process. This has led to hydrogen being regarded as a 'carrier' of energy, like electricity, rather than a 'source'. The unproven dehydrogenating process has also been suggested for the use water as an energy source. Efficiency mechanisms such as Megawatt power can encourage significantly more effective use of current generating capacity. It is a term used to describe the trading of increased efficiency, using consumption efficiency to increase available market supply rather than by increasing plant generation capacity. As such, it is a demand-side as opposed to a supply-side measure.

Therefore, several power-generating devices have been developed in the past. However, they provide for a number of more or less complicated features that fail to solve the problem in an efficient, economical and environmentally safe way. None of those devices suggest the novel features of the present invention.

SUMMARY OF THE INVENTION

The instant invention in one embodiment is a universal power generating system, comprising:

A) at least one turbine configured to be turned by airflow;
B) an electrical generator operatively associated with said turbine; and
C) an enclosure constructed and arranged to capture airflow from an air conditioner air handler whereby said captured in a flow is directed in a manner to rotate said turbine.

In one embodiment of the invention the universal power generating system is further characterized in that more than one turbine is positioned in-line within the enclosure.

The enclosure encompasses a substantially airtight system for receiving said captured airflow.

The system is configured with appropriate electrical circuitry to transmit electricity generated by said electrical generator and store said electricity in one or more batteries operatively associated with the system.

In another embodiment, more than one air conditioner air compressor is operatively associated with the system.

The present invention also includes a system configured for the simultaneous purification of water and generation of electricity, comprising:

A) at least one turbine configured to be turned by airflow;
B) an electrical generator operatively associated with said turbine; and
C) at least one water tank having a cover and at least a portion of said tank each being constructed of a transparent or translucent material;
D) an outlet positioned along the upper one third of said tank said outlet constructed and arranged to receive steam generated by water in said tank; and
E) an enclosure constructed and arranged to capture airflow from said water purification tank, whereby said captured airflow is directed in a manner to rotate said turbine.

In one embodiment, the airflow is further combined with airflow from at least one air conditioner air handler and the combined airflow is directed in a system towards at least one turbine.

In one embodiment, a plurality of mirrors or light amplification devices are positioned about the interior circumferential surface of said tank. The plurality of mirrors or light amplification devices are positioned to focus light onto the water surface of water in said tank. Thus, the tank is constructed and arranged to heat water placed therein by sunlight. The plurality of mirrors were light amplification devices are constructed and arranged to interact with sunlight entering said tank and concentrate light energy from sunlight on to water contained with in said tank. The concentration of said sunlight produces steam that exits the tank through the steam outlet.

The present invention also contemplates a method of simultaneously utilizing a water purification system and electricity generating system said method comprising the steps of:

A) providing a system according to the invention herein;
B) placing water in a tank;
C) exposing the tank of said system to sunlight;
D) generating water vapor from said exposing;
E) capturing said water vapor;
F) directly said captured water vapor to said turbine; and
G) collecting purified water in a water collection vessel whereby said vessel is formed to collect condensate produced by said water vapor.

The method includes placing a plurality of mirrors or light amplification devices about the interior circumferential surface of said tank and directing said mirrors or light amplification devices onto the surface of the water in the tank.

In one embodiment the method includes connecting said captured water vapor in an enclosure that joins said captured water vapor with captured airflow from an air conditioner air compressor exhaust.

The method contemplates transmitting electricity produced by said electrical generator to at least one battery for storage.

It is therefore one of the main objects of the present invention to provide a universal power generating system that is energy efficient and environmentally safe.

It is another object of this invention to provide a universal power generating system that generates cost efficient energy.

It is another object of this invention to provide a universal power generating system that can be utilized in residential structures including homes, condos, townhomes, and apartments; commercial buildings and structures including stand-alone buildings and strip malls; and with industrial electrical systems.

It is another object of this invention to provide a universal power generating system that minimizes pollution, acid rain, deforestation, global warming, ozone depletion layers, and other environmental catastrophes.

It is another object of this invention to provide a universal power generating system that is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 7 is an isometric view of the vapor generating tank assembly shown in FIG. 6.

DETAILED DESCRIPTION OF THE PREFERRED EMBODIMENT

Figure 1:
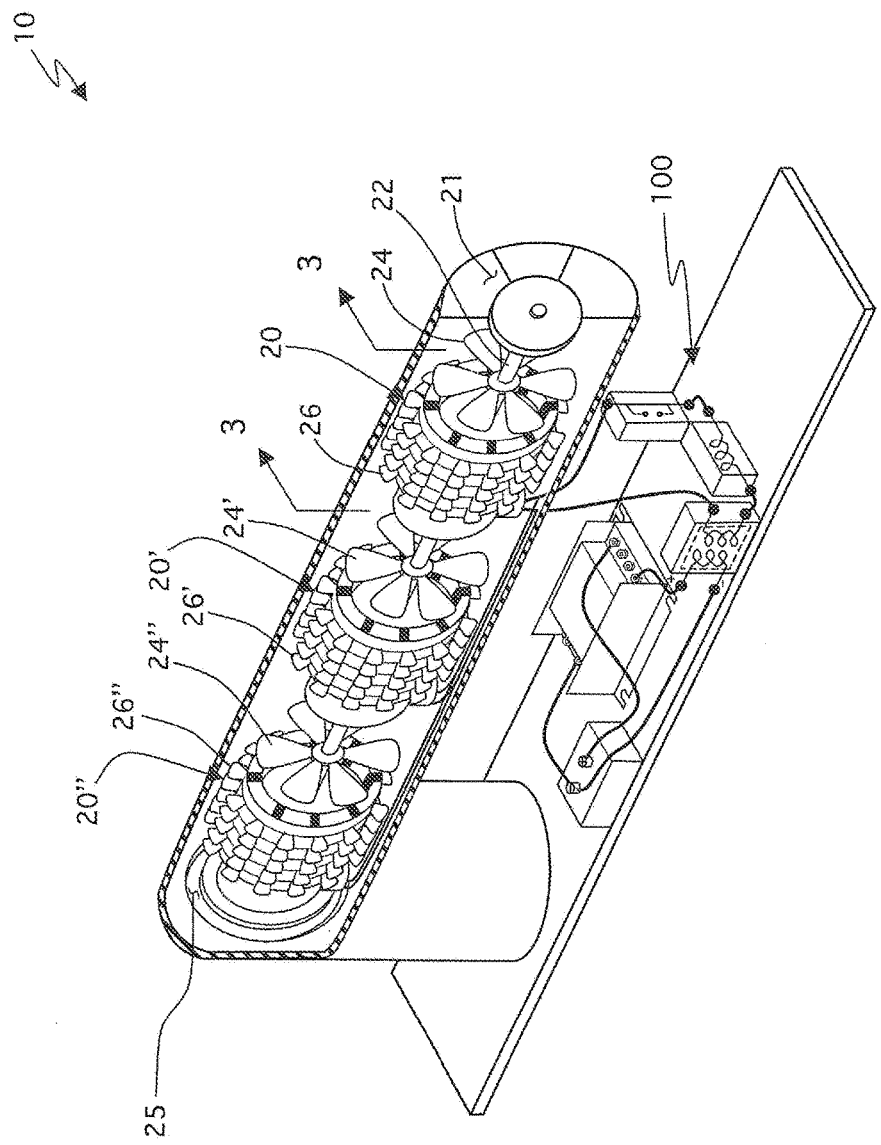
FIG. 1 represents an isometric view of the preferred embodiment for the power generating system, object of the present application.

Referring now to the drawings, the present invention is a universal power generating system, and is generally referred to with numeral 10. Present invention 10 is generally based on a turbine system whereby a plurality of propellers and turbines are positioned in-line as generally shown in the accompanying figures. Present invention 10 comprises one or more wind powered electrical turbines contained within an enclosure.

As seen in FIG. 1, shaft 22 extends through each of electromagnetic generator systems 20, 20', and 20" within an interior cavity defined by nacelle enclosure 34. Nacelle enclosure 34 comprises inlet 21 and outlet 25. Electromagnetic generator systems 20, 20', and 20" are also defined as first turbine 20, second turbine 20', and third turbine 20" and are positioned in line whereby inlet 21 enables propellers and turbine blades 24 and 26; 24' and 26'; and 24" and 26" respectively to rotate. Present invention 10 further comprises electrical system 100 having appropriate circuitry and batteries for transmitting electrical energy from any electrical generation device used with present system 10 and storing this electrical energy in one or more batteries utilizing appropriate electronics known to persons having ordinary skill in the art.

Figure 2:
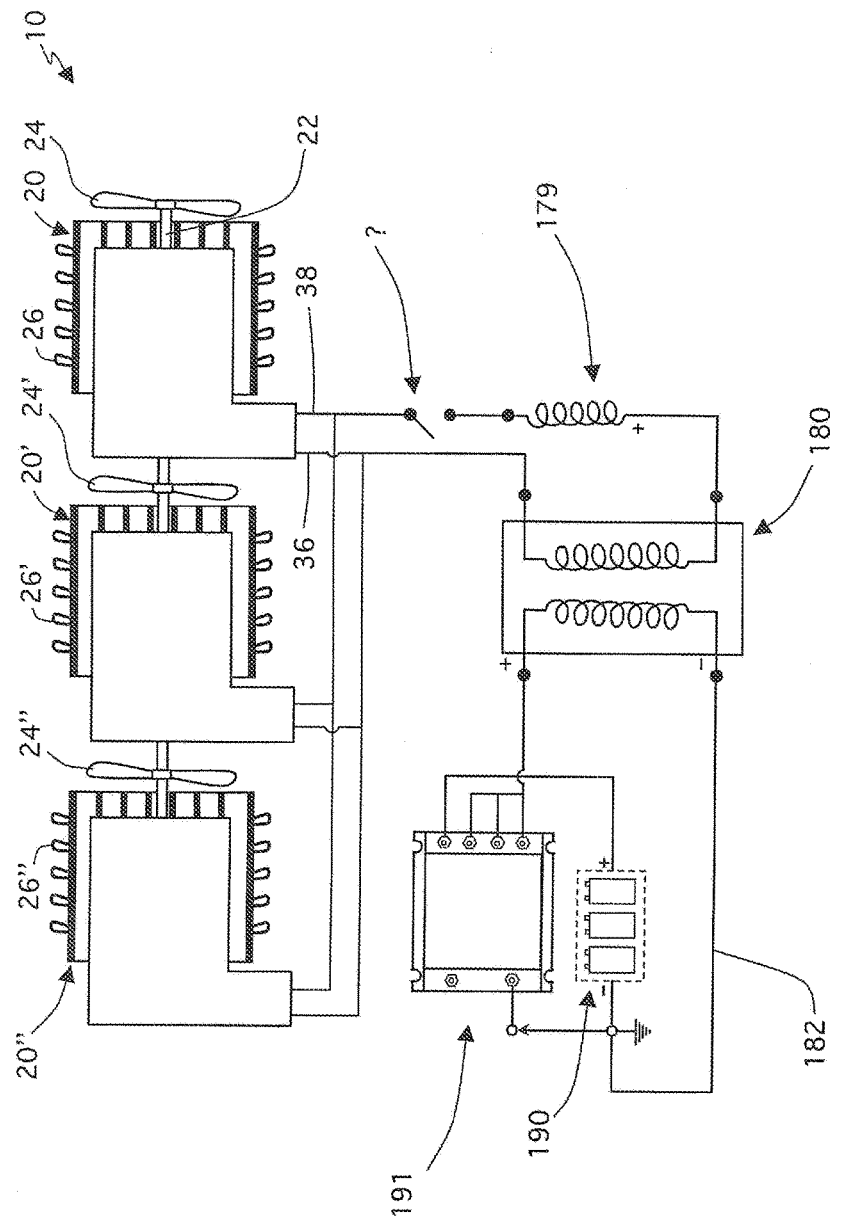
FIG. 2 is a schematic diagram of the power generating system shown in FIG. 1.
Figure 3:
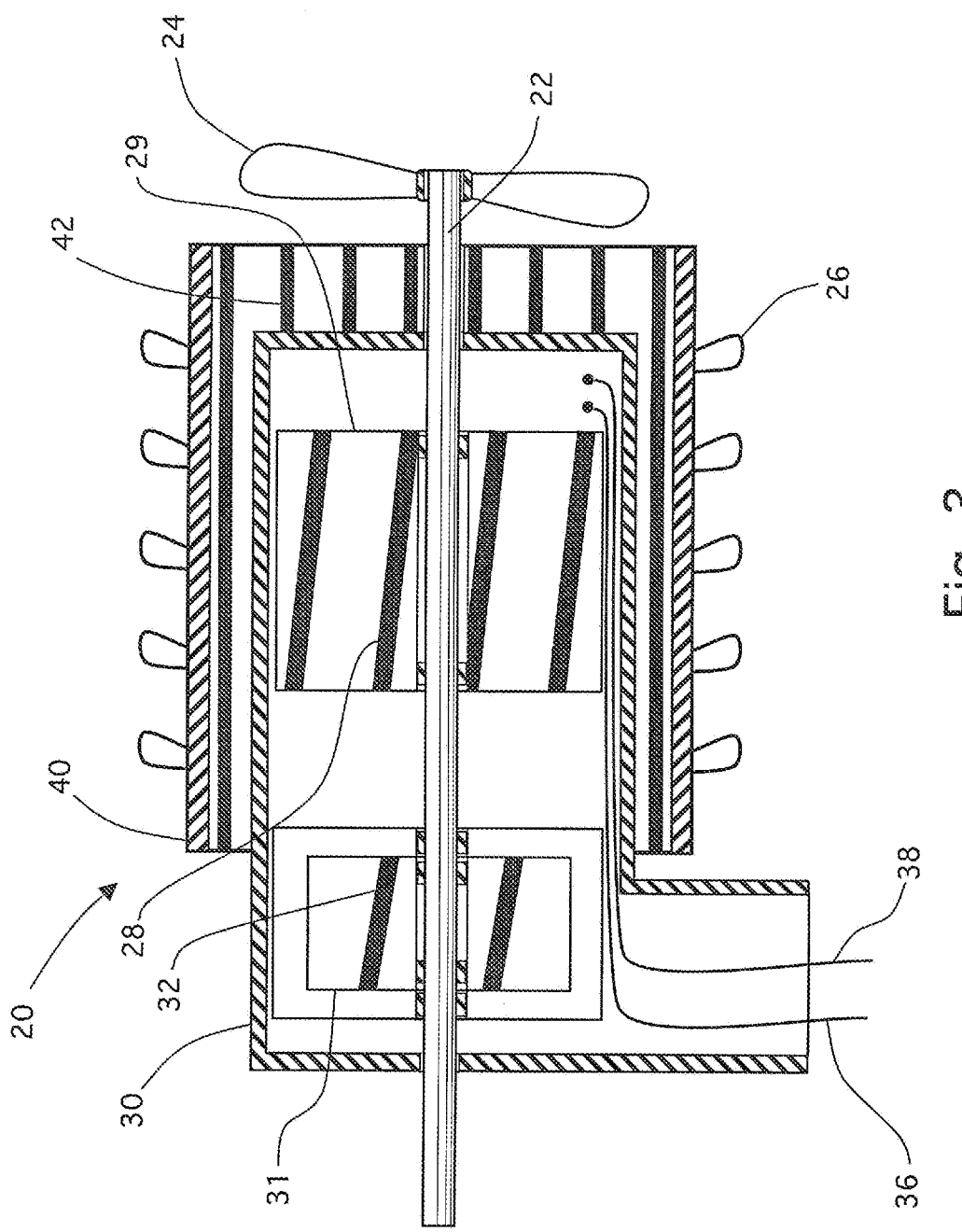
FIG. 3 is a cross-section view taken along lines 3-3 from FIG. 1, showing the internal components of one of the electromagnetic generator systems used with the present invention.

As seen in FIGS. 2 and 3, electromagnetic generator systems 20, 20', and 20" convert mechanical energy generated from a rotation of shaft 22 to electrical energy that flows to inductor 179. Electrical energy then flows from inductor 179 to transformer 180 and through electrical wiring 182 to rechargeable battery bank 190. Electrical system 100 further comprises controller 191 comprising a computer program stored on a non-transitory computer readable medium.

In a preferred embodiment, rechargeable battery bank 190 comprises a plurality of rechargeable batteries, defined as electrochemical cells. They are also known as secondary cells because their electrochemical reactions are electrically reversible. Rechargeable batteries come in many different shapes and sizes, ranging anything from a button cell to megawatt systems connected to stabilize an electrical distribution network. Several different combinations of chemicals are commonly used, including: lead-acid, nickel cadmium (NiCd), nickel metal hydride (NiMH), lithium ion (Li-ion), and lithium ion polymer (Li-ion polymer). Rechargeable batteries have lower total cost of use and environmental impact than disposable batteries. Rechargeable batteries can be recharged and used many times.

Within each of electromagnetic generator systems 20, 20', and 20", of which electromagnetic generator system 20 is illustrated in FIG. 3, are respective electrical generating components including generator magnets 28 mounted onto hub 29, and generator magnets 32 mounted onto hub 31, within interior stationary housing 30 that are operatively associated with shaft 22 such that the rotational motion of generator magnets 28 and 32 in proximity to electrical wires 36 and 38 positioned about a circumferential surface of electromagnetic generator system 20 impart an electrical field which is captured and transmitted from electromagnetic generator system 20 by one or more electrical transmission lines defined as electrical wires 36 and 38. Hubs 29 and 31 in a preferred embodiment can be manufactured of an iron laminated core. It is noted that hubs 29 and 31 are fixedly mounted onto shaft 22. Electromagnetic generator system 20 further comprises exterior rotational housing 40 having turbine blades 26 protruding outwardly therefrom, and permanent magnets 42 mounted within. Exterior rotational housing 40 and propeller 24 are also fixedly mounted onto shaft 22. Propeller 24 and turbine blades 26 are cooperatively shaped whereby wind forces cause propeller 24 and turbine blades 26 to turn, causing shaft 22 to rotate. It is noted that electromagnetic generator systems 20' and 20" comprise the same components as electromagnetic generator systems 20.

Figure 4:
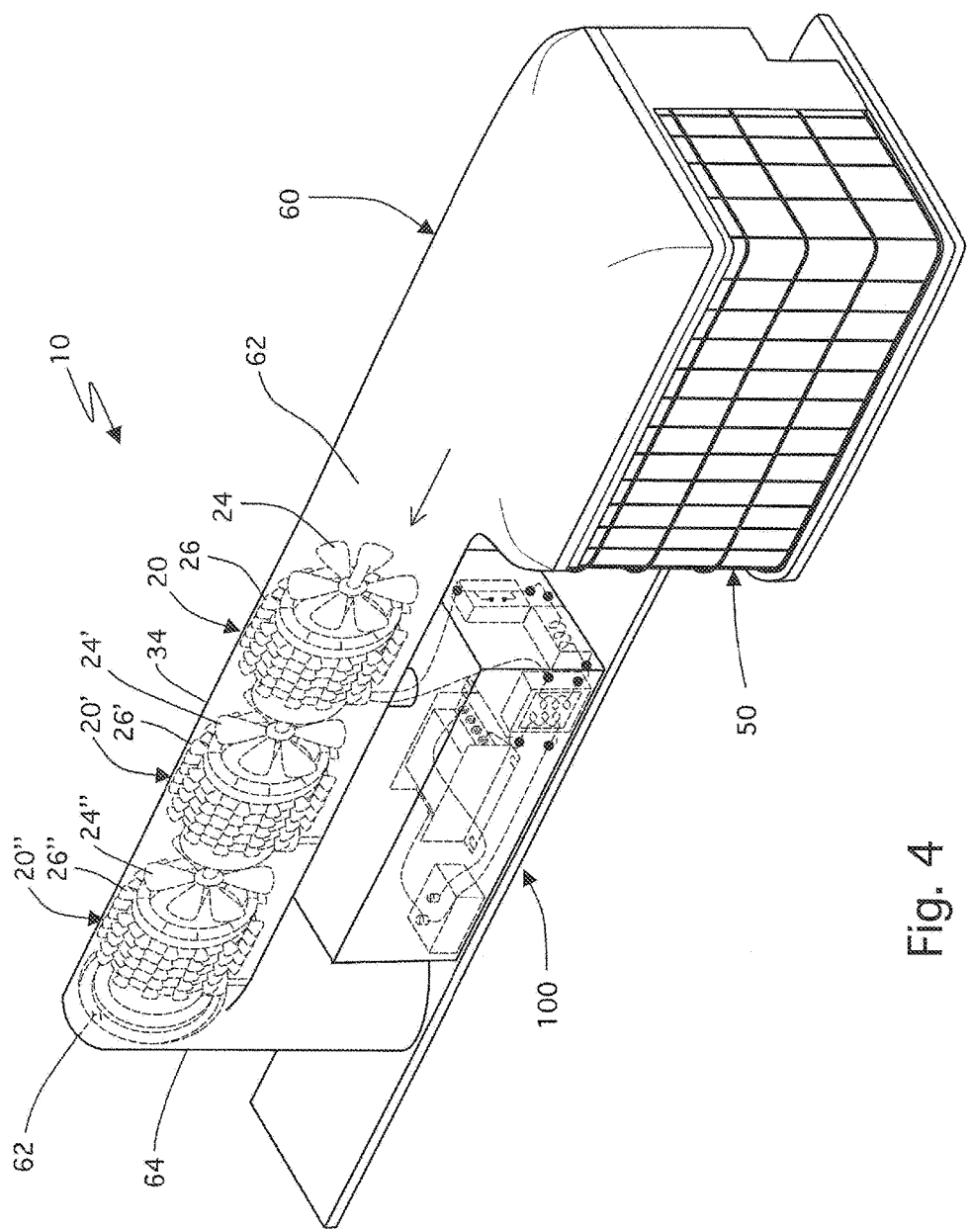
FIG. 4 is an isometric view of the invention, showing one of the possible applications for the instant invention, wherein it is connected to an air conditioner assembly.

As seen in FIG. 4, present invention 10 comprises a configuration by which exhaust air that is normally released into a local atmosphere is captured and utilized for electromagnetic generator systems 20, 20', and 20" of present invention 10. In this particular embodiment, a conventional air conditioner air compressor 50 that is typically part of a larger system has an internal fan (not shown) that forces air into a local area. Present invention 10 comprises a system whereby cover 60 captures and directs exhausted from air compressor 50 in a general airflow direction indicated by directional arrow A of FIG. 4, into narrow chamber 62 in which one or more electromagnetic generator systems 20, 20', and 20" are positioned. Airflow indicated by directional arrow A forced into inlet 21 turns propellers and turbine blades 24 and 26; 24' and 26'; and 24" and 26" of electromagnetic generator systems 20, 20', and 20" respectively and eventually exits through outlet 25. It is contemplated that any electromagnetic generator systems 20, 20', and 20" used in a configuration according to this embodiment be constructed and arranged such that imparted resistance on airflow indicated by directional arrow A does not unduly or inefficiently burden an exhaust fan of air conditioner air compressor 50.

In alternate embodiments, present invention 10 may be configured to elevated structures, skyscrapers, utility and/or electrical poles, water towers, and similar structures elevated to benefit from a wind force or wind streams.

Figure 5:
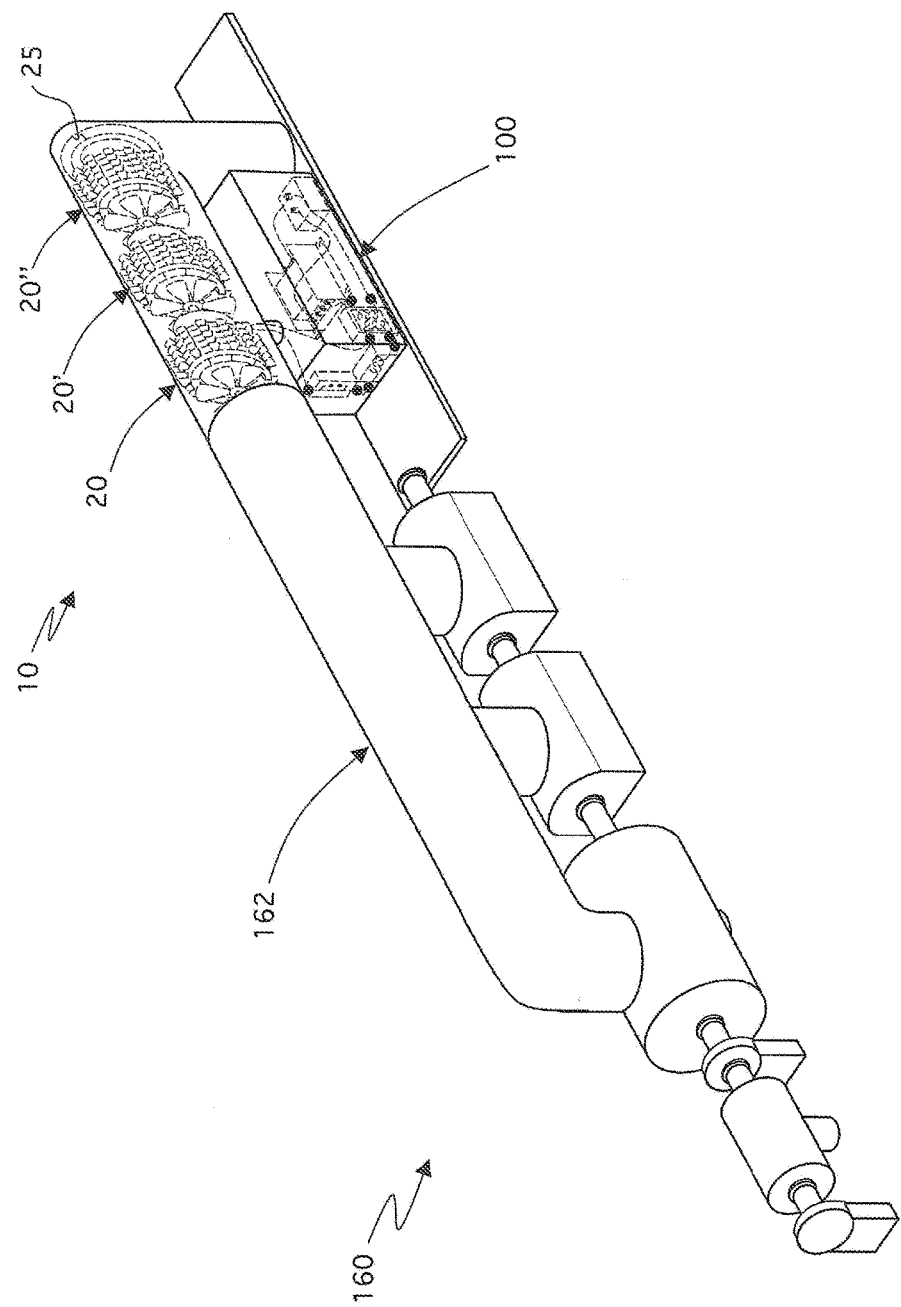
FIG. 5 is an isometric view of the invention, showing another possible application for the invention, wherein it is connected to the steam turbines of a nuclear plant.

As seen in FIG. 5, present invention 10 comprises a configuration by which steam from a nuclear power steam stack exhaust that is normally released into a local atmosphere is captured and utilized for electromagnetic generator systems 20, 20', and 20" of present invention 10. In this particular embodiment, steam from nuclear power plant 160 is captured and directed through narrow chamber 162 to one or more electromagnetic generator systems 20, 20', and 20", turning propellers and turbine blades 24 and 26; 24' and 26'; and 24" and 26" of electromagnetic generator systems 20, 20', and 20" respectively and eventually exits through outlet 25. It is contemplated that any electromagnetic generator systems 20, 20', and 20" used in a configuration according to this embodiment be constructed and arranged such that imparted resistance on the steam does not unduly or inefficiently burden the nuclear power plant.

Figure 6:
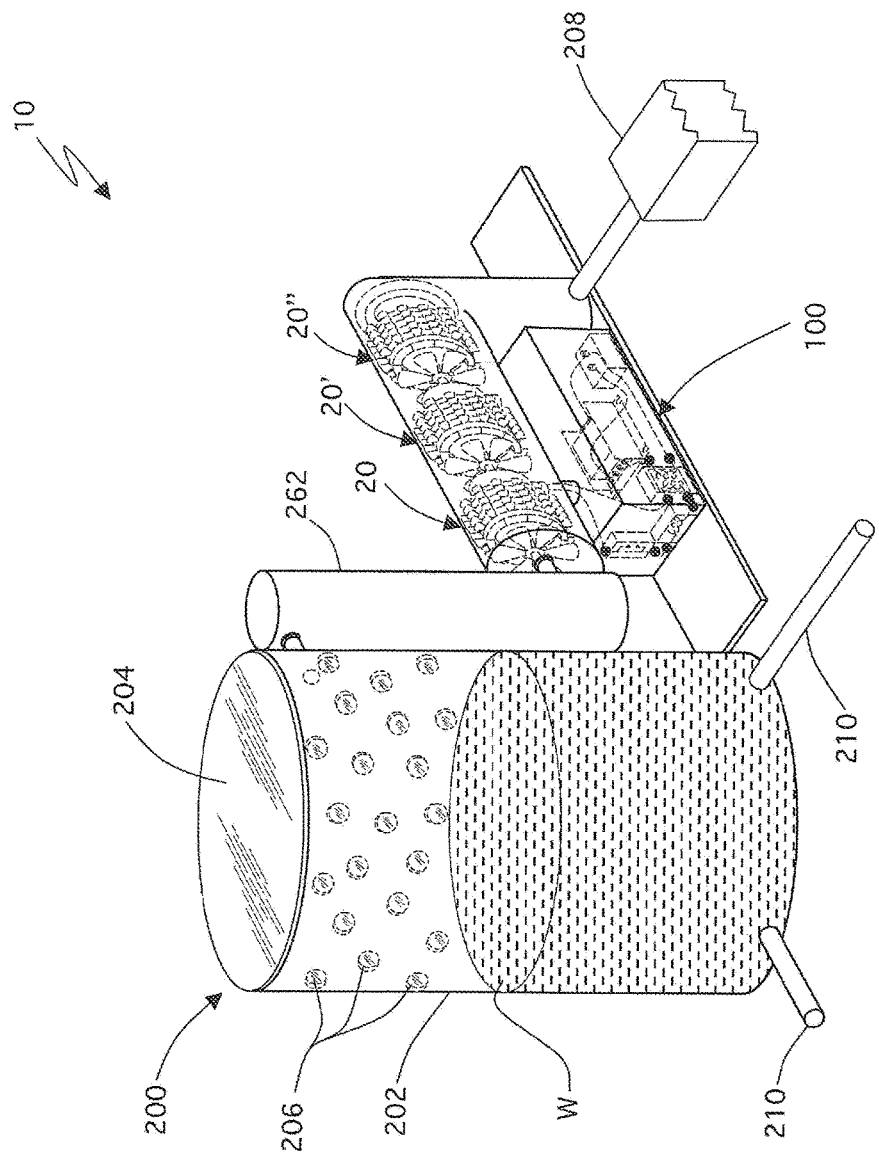
FIG. 6 is an isometric view of the invention as shown in FIG. 1, showing a vapor generating tank connected to the system to enhance the vapor supply to the steam turbines.

As seen in FIGS. 6 and 7, present invention 10 comprises a configuration by which steam from solar actuated water purification system 200 is captured and utilized for electromagnetic generator systems 20, 20', and 20" of present invention 10. In this particular embodiment, solar actuated water purification system 200 produces steam. Present invention 10 comprises a system whereby narrow chamber 262 captures and directs the steam to one or more electromagnetic generator systems 20, 20', and 20", turning propellers and turbine blades 24 and 26; 24' and 26'; and 24" and 26" of electromagnetic generator systems 20, 20', and 20" respectively and eventually exits through outlet 25. It is contemplated that any electromagnetic generator systems 20, 20', and 20" used in a configuration according to this embodiment be constructed and arranged such that imparted resistance on the steam does not unduly or inefficiently burden solar actuated water purification system 200.

Solar actuated water purification system 200 comprises one or more water tanks 202. In this particular embodiment, tank 202 has lid 204 that is either transparent or translucent. Water W placed within tank 202 is heated by sunlight. In one embodiment, a plurality of mirrors or alter light amplification materials 206 are positioned about an interior circumferential surface of tank 202. The alter light amplification materials 206 may comprise lasers systems. It is contemplated that plurality of mirrors or alter light amplification materials 206 directionally concentrate sunlight entering through lid 204 and onto water W. Water W can be any water, namely fresh, brine, or salt water. Steam is generated and purified water is produced. The steam exits tank 202 through narrow chamber 262, travels through present invention 10, and purified water is collected into collection vessel 208. In this embodiment as a desalination system, it is contemplated that impurities and/or particulates are drained from tank 202 through one or more lower drain outlets 210.

In one embodiment, lid 204 is removable and tank 202 is filled as desired. In this embodiment, the system of the present invention encompasses a dual functionality whereby water is purified and captured in collection vessel 208 and steam generated by solar actuated water purification system 200 of present invention 10 is directed to turn electromagnetic generator systems 20, 20', and 20" in order to produce electricity.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A universal power generating system, comprising:
   a plurality of turbines configured to be turned by airflow, said turbines positioned in line horizontally on a shaft such that said shaft extends through each of the turbines, wherein each of said turbines comprise turbine blades protruding outwardly from an exterior rotational housing and a propeller, the turbine blades being cooperatively shaped whereby airflow causes said propellers and said turbine blades to turn, causing said shaft to rotate;
   a plurality of electrical generators each of which is operatively associated with a respective one of said plurality of turbines; and
   an enclosure constructed and arranged to capture airflow from an air conditioner air handler whereby said captured airflow is directed in a manner to rotate said plurality of turbines, wherein said enclosure is mounted on top of said air conditioner air handler as a horizontal structure, such that the air handler is enclosed, the enclosure extending horizontally and narrowing to form a cylindrical chamber in which each of said plurality of turbines is positioned, said cylindrical chamber of the enclosure ending at a vertical support, the enclosure being supported by the air conditioner air handler on the proximal end and said vertical support on the distal end;
   wherein said universal power generating system is configured with electrical circuitry to transmit electricity generated by said electrical generators and store said electricity in one or more rechargeable batteries connected to the electrical generators.

2. The universal power generating system set forth in claim 1, further characterized in that said enclosure encompasses a substantially airtight system for receiving said captured airflow.

3. The universal power generating system set forth in claim 1, further characterized in that said one or more rechargeable batteries are configured to be removed from the system once fully charged.

4. The universal power generating system set forth in claim 1, further characterized in that more than one air conditioner air compressor is operatively associated with the system.

\* \* \* \* \*